Oct. 27, 1970

D. W. NORWOOD 3,536,408

COMPATIBLE PHOTOELECTRIC DEVICE HAVING GREATER RESPONSE
TO A PRIME PORTION OF A SCENE

Filed April 14, 1967

DONALD W. NORWOOD
INVENTOR.

BY *Jml E. Schmnd*

ATTORNEY.

Oct. 27, 1970  D. W. NORWOOD  3,536,408
COMPATIBLE PHOTOELECTRIC DEVICE HAVING GREATER RESPONSE
TO A PRIME PORTION OF A SCENE
Filed April 14, 1967  2 Sheets-Sheet 2
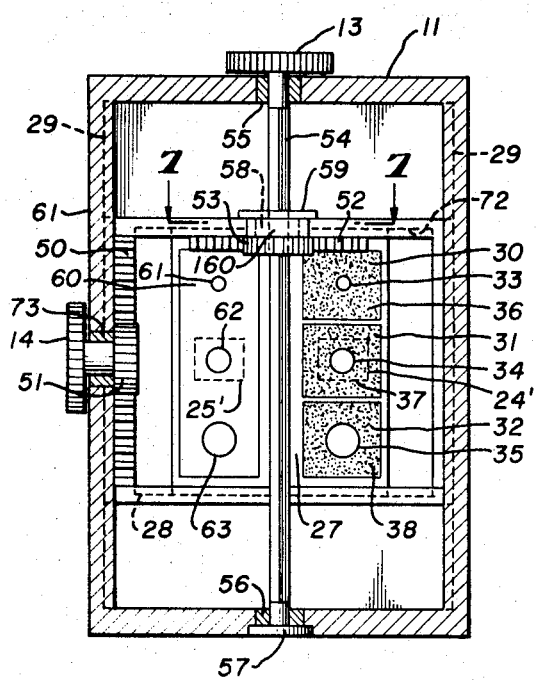
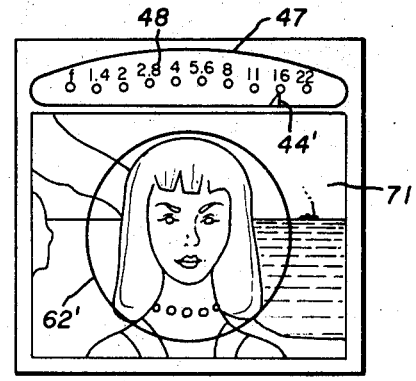
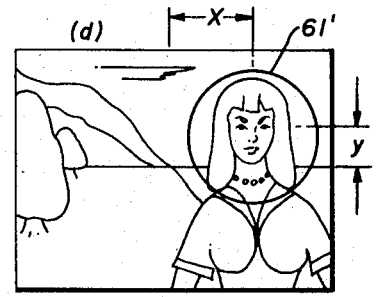
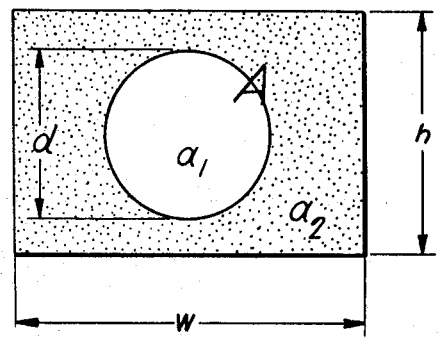
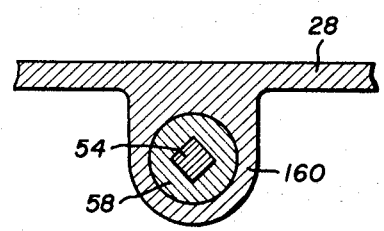
DONALD W. NORWOOD
INVENTOR.
BY
ATTORNEY.

United States Patent Office 3,536,408
Patented Oct. 27, 1970

3,536,408
COMPATIBLE PHOTOELECTRIC DEVICE HAVING GREATER RESPONSE TO A PRIME PORTION OF A SCENE
Donald W. Norwood, 1470 San Pasqual St., Pasadena, Calif. 91106
Filed Apr. 14, 1967, Ser. No. 631,067
Int. Cl. G01j *1/42, 1/44*
U.S. Cl. 356—219          5 Claims

ABSTRACT OF THE DISCLOSURE

Apparatus for determining the proper setting of a camera in exposure control in accordance with the brightnesess of both the prime inner portion of a photographic scene and the remaining background portion of that scene, regardless of the relative size of the prime portion and the location thereof relative to the background portion of the scene.

---

In my U.S. Pats. No. 3,121,170, dated Feb. 11, 1964 and No. 3,304,435, dated Feb. 14, 1967, I disclosed devices for simultaneously evaluating a centrally located prime portion comprised of the center of interest of a scene and the remaining background portion of a scene and for indicating the appropriate exposure setting of a camera. The present invention constitutes an improvement over the said inventions in that it provides unique elements which serve to make the present invention more versatile in providing suitable exposures for a greater variety of types of photographic scenes, particularly those in which the pictorially prime portion, such as a person's face, may be located off-center in the scene, or in which the said prime portion may be at any one of various distances from the camera, and each of these distances produces a different size of image in the camera frame relative to the background. A factor of major importance is that the brightness value of such prime portion be correctly determined. Such value is best evaluated if the size of the light receptor for the prime portion in the apparatus is appropriate for the size of such prime portion. My invention provides means whereby the size of the light receptor for the prime portion can be selectively altered so as to be consistent with the size of such prime portion at all camera-to-subject distances usually encountered.

Another scenic variation occurs when the prime portion is located away from the center of the picture frame. To handle such cases, my invention provides adjustable means whereby the light receptor for the prime portion may be moved within the limits of the picture frame to accommodate the image of such prime portion wherever it may be in the scene.

Occasionally, a protographic scene will be encountered which does not have any well defined prime portion, such as an outdoor landscape scene devoid of an actor in the foreground. Appropriate exposure can be accomplished if the prime portion is considered to be relatively large. My invention provides a suitable size of prime portion light receptor for such situation.

The above mentioned adjustments involve changes in the size or location of the light receptor for the prime portion with respect to the light receptor for the remaining portion. In such cases, it is desirable that information revealing the exact nature of the adjustment be conveyed to the operator and my invention provides such information.

My invention provides for simplicity of operation in that only two controls for adjustments are involved. One provides for a selective change in size of the light receptor for the prime portion and also serves to adjust the vertical location of the receptor. The other serves to adjust the lateral location of the receptor. Also this apparatus serves to simultaneously and automatically disclose to the operator precise information regarding the adjustments.

A full understanding of the invention and of its further objects and advantages will be had from the following description of a preferred embodiment when read in conjunction with the accompanying drawings, wherein:

FIG. 3 is a section taken substantially along lines 3—3 of FIG. 1 illustrating the movable panel of filters and corresponding prime portion indicating means.

FIG. 4 illustrates a typical image of a photographic scene and meter scale as seen in the view finder.

FIG. 5 is a view showing another typical scene, including a prime portion of a different size and in a different relative location than that shown in FIG. 4.

FIG. 6 is a view illustrating diagrammatically the relative size of one prime portion relative to the remaining portion.

FIG. 7 is a sectional plan view taken along line 7—7 of FIG. 3.

Figure 1:
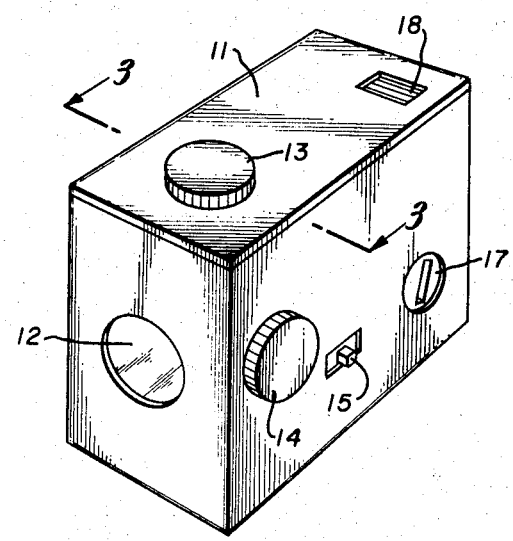
FIG. 1 is a perspective view of a photographic exposure meter which embodies the invention.
Figure 2:
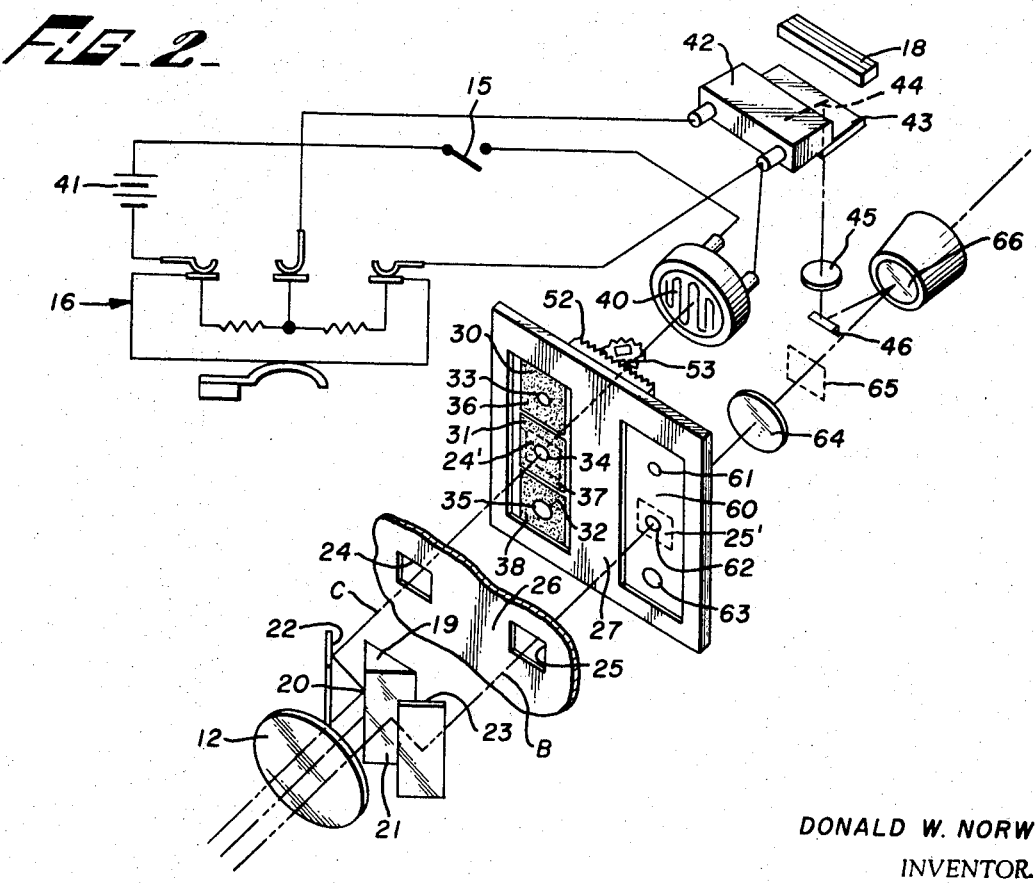
FIG. 2 is an exploded perspective view illustrating the basic elements of the meter.

Referring to the drawings, the meter is contained in a lightproof housing 11, in the front wall of which is mounted an objective lens 12 Fixed beam splitting mirrors 20, 21, 22 and 23 are located behind the lens 12 to split the image of a photographic scene received by the lens into two parallel and similar images and to direct the same along two optical axes B and C which lie in the same horizontal plane.

The image directed along axis B passes through a framing opening 25 in a fixed masking plate 26 located in or adjacent the focal plane of the objective, through a transparent prime portion indicator plate 60 carried by a movable panel 27 and through spaced erector and magnifying lenses 64 and 66 which comprise a view finder, through which a scene to be evaluated may be viewed from the rear of the housing.

The second image directed along axis C passes through a second framing opening 24, through one of three filter elements 30, 31 and 32 carried by the panel 27 located in or adjacent the focal plane of the objective, and onto a photo-resistive type photocell 40.

Cell 40 is provided in circuit with a manually settable switch 15 (see also FIG. 1), accessible from the exterior of the housing, a battery 41, a sensitivity adjusting device, generally indicated at 16, and a microammeter 42. The latter has a translucent scale plate 43 having scale indicia thereon, the image of which is seen at 48 in FIG. 4, and an indicating pointer 44. The pointer moves along the scale indicia to indicate the brightness of the image and this is translated by the indicia to indicate the appropriate setting of the camera in terms of $f$ numbers, as will be described fully later on.

The scale and pointer 44 are visible through the view finder and for this purpose a translucent light collector 18 is mounted in an opening in the top wall of the housing 11 to transmit exterior light downwardly through the scale plate 43 to illuminate the same. A lens 45 projects a reduced image of the scale and pointer onto a small prism 46 located intermediate the view finder lenses 64 and 66 to direct such image rearwardly so that it may be viewed at the same time as the scene being evaluated is viewed in the view finder. FIG. 4 illustrates the composite view as seen in the view finder, the image of the scale being seen at 47 and the image of the pointer being seen at 44'. The image of the scene is indicated at 71.

The sensitivity control unit 16 is of well-known construction and is disclosed in detail in my U.S. Pat. No. 3,286,097, dated Nov. 15, 1966.

Describing now the adjustable light receptor unit, the upper filter 30 has a small circular primary area 33 of relatively high light transmission characteristics surrounded by a larger secondary area 36 of relatively low light transmission characteristics. The filter 31 has a medium size centrally located high transmission primary area 34 and a surrounding low transmission secondary area and the filter 32 has a large centrally located high transmission primary area 35 surrounded by a low transmission secondary area. In a preferred form of the apparatus all of the primary areas have the same overall transmission characteristic, as do all of the framed secondary areas.

By appropriate adjustment of the panel 27, as will now be described, any one of the filters 30, 31 and 32 may be located to modify the image 24' directed through the opening 24 and it should be noted at this point that each filter is larger than the image 24' falling thereon and defined by the framing opening 24.

It may also be noted that the effective overall transmission of the acting framed filter affects the responsiveness of the entire system. "Framed filter" is intended to define the primary area of the filter and that portion of the secondary area which is uncovered by the opening 24 in the masking plate 26. It should also be noted that I intend the term "responsiveness" to define the sensitivity of the system to each unit quantity of light, such as a lumen, from the scene, and the term "response" to mean the total reaction of the system to light from the scene.

Describing now the means for adjusting the panel 27, the latter is slideable horizontally in grooves 72 formed in a rectangular frame 28 which, in turn, is slideably mounted for vertical movement in grooves 29 formed in the side walls of the housing 11.

The frame 28 has a vertical gear rack 50 thereon meshing with a pinion 51 carried by the shaft of a knob 14, which shaft is journalled in a bearing 73 formed in the side wall of the housing. Rotation of the knob can locate any of the filters 30, 31 and 32 to modify the image directed through the framing opening 24 and can further adjust the location of the high light transmission area of such filter vertically relative to the scene image 24'.

The panel 27 has a horizontally extending gear rack 52 which meshes with a pinion 53 slideably splined to a shaft 54 which is journalled in bearings 55 and 56 carried by the housing 11. The pinion 53 has a bearing portion 58 journalled in a bearing bracket 160 extending from the frame 28. A flange 59 at the top of the bearing portion 58 extends over the bracket to retain the pinion in place. By rotating a knob 13 on the shaft 54, the panel 27 may be adjusted horizontally to move the high transmission area of whichever filter is in place relative to the image area 24'.

The transparent plate 60 has etched thereon three circles, 61, 62 and 63, which are arranged in size corresponding to the size of the high light transmission areas 33, 35 and 36, respectively, of the filters. Such circles are visible in the view finder, as shown, for example, at 62' in FIG. 4.

In operating the meter, the sensitivity is adjusted for the photographic speed of the particular film to be used in a camera by connecting an appropriate sensitivity unit 16 in the photo-cell circuit. The switch 15 is closed and the meter is aimed at the photographic scene which is formed in the view finder. The knob 14 is then rotated until an appropriate sized boundary circle 61, 62 or 63 for the dominant area shows in the view finder. The knobs 13 and 14 are then adjusted to cause the boundary circle to properly encompass the image of such dominant area. The indicator 44, as viewed in the view finder, then correctly indicates the appropriate $f$ stop for the camera lens.

FIG. 4 illustrates a scene wherein the center of interest or dominant area comprises the face of an actress which is located at a close-up distance from the point of view. Accordingly, the filter 31 is located behind the framing opening 24 and the image 62' of the circle 62 encompasses the dominant part. In this case, the dominant part will be located centrally of the scene.

FIG. 5 illustrates the center of interest as being located at a further distance from the point of view and to one side of the center of the scene. Accordingly, the filter 30 is placed behind the framing opening 24 and the knobs 13 and 14 are adjusted to cause the image 61' of circle 61 to encompass the image of the center of interest.

The filter 32 may also be used for landscape scenes without a foreground subject in which it can be considered that the major portion of the scene constitutes the dominant area.

Factors involved in the design of the meter are the respective sizes of the high transmission areas 33, 34 and 35; the respective transmission factors for the said areas; and the respective transmission factors for the low transmission areas. Some of these factors are determined by empirical means, while for some there is an imperative interlock relationship.

For analytical purposes, the framed portion of a typical filter is shown in FIG. 6. The following notation is applicable:

$h$=height of framed filter.
$w$=width of framed filter.
$A$=area of framed filter, $=hw$.
$d$=diameter of high transmission portion.
$a_1$=area of high transmission portion $$=\pi\left(\frac{d}{2}\right)^2$$

$a_2$=area of low transmission portion=$A-a_1$.
$t_1$=transmission/unit area of high transmission portion.
$t_2$=transmission/unit area of low transmission portion.
$T_1$=total transmission of high transmission portion.
$T_2$=total transmission of low transmission portion.
$T_F$=total transmission of framed filter=$T_1+T_2$.

The transmission/unit area factor for each portion of each filter can be determined by applying the following formulae:

$$t_1=\frac{T_1}{a_1}$$

$$t_2=\frac{T_2}{a_2}$$

In connection with the said determination of values, I have discovered, by empirical methods, that a useful set of three filters has the following sizes for $a_1$.

| Filter: | $a_1$ size |
|---|---|
| 30 | .10 A |
| 31 | .24 A |
| 32 | .59 A |

Also, that a useful ratio between $T_1$ and $T_2$, is $T_1=1.5T_2$. That $T_F$ must be a constant for all filters in a given set. That a useful value for $T_F$ is 16.67%.

Then $T_1=10\%$, and $T_2=6.67\%$.

Application of the foregoing formulate, and the indicated constants, provides the following results.

| Filter | $a_1$ | $t_1$ | $a_2$ | $t_2$ |
|---|---|---|---|---|
| 30 | .10 A | 1.00 | .90 A | 0.074 |
| 31 | .24 A | 0.42 | .76 A | 0.088 |
| 32 | .59 A | 0.17 | .41 A | 0.160 |

It may be noted that as the $a_1$ values increase from one filter to another, the $t_1$ values decrease; and as the $a_2$ values decrease, the $t_2$ values increase. This is a unique compensating feature which maintains a constant and appropriate ratio between the influence of the dominant are and the influence of the secondary area, and at the same time maintains a constant value for $T_F$.

Although the embodiment of the invention disclosed comprises a handheld photographic exposure meter, it will be understood that the invention is not limited to such embodiment but can also be incorporated in a camera. In such embodiment, the meter can be arranged to respond to light which comes through the camera lens as the scene image. It can operate in connection with a fully automatic mechanism for adjusting the camera lens diaphragm or in connection with a semi-automatic mechanism wherein the lense diaphragm is adjusted manually or by servomechanism under guidance of an electrical indicator. It will also function in connection with various electrical or optical arrangements for adjusting the sensitivity of a device to match the sensitivity of the film being used. It will further function in connection with cameras having lenses of either the fixed focal length or variable focal length types.

I claim:

1. Photometric apparatus comprising lens means for forming an immage of a scene having a pictorially prime portion and a remaining portion,
a framing mask located in the light path of said lens means and at least substantially coincident with the focal plane thereof for establishing a boundary for the image of said scene,
a signal utilization device,
photosensitive means in the light path of said lens means and effective to control said signal utilization device in accordance with the brightnesses of said image,
a plurality of light filters each having a primary area and a secondary area,
the respective primary areas of said light filters being of different relative sizes,
each of said primary areas having a light transmission characteristic greater than that of the secondary area of the respective light filter,
mechanical adjusting means for selectively positioning any one of said light filters in the light path intermediate said lens means and said photosensitive means and in a plane at least substantially coincident with the focal plane of said lens means, and
mechanical adjusting means for moving a selectively positioned one of said light filters in different directions parallel to said focal plane whereby said primary area thereof may be aligned with the prime portion of the image of said scene.

2. Photometic apparatus according to claim 1 comprising a viewfinder and optical means operatively connected to said light filter means for automatically indicating in said viewfinder the size and relative location of the primary area of the selectively positioned one of said light filters relative to the image of said scene.

3. Photometric apparatus according to claim 1 wherein the said light filters comprise light filters having transmission characteristics such that the same ratio exists in the case of every light filter between the total transmission factor of the primary area and that of the secondary area.

4. Photometric apparatus according to claim 1 wherein said light filters comprise light filters having transmission characteristics such that the overall transmission factor of every framed light filter is the same.

5. Photometric apparatus comprising lens means for forming an image of a scene,
framing mask means located in the light path of said lens means and at least substantially coincident with the focal plane thereof for establishing a boundary for the image of said scene,
an electrical indicator,
photoelectric means in the light path of said lens means and effective to control said indicator in accordance with the brightnesses of said scene,
a plurality of light filters each having an area of relatively high light transmission characteristic surrounded by an area of relatively low light transmission characteristic,
the respective areas of relatively high light transmission characteristics of said light filters being of different relative sizes,
mechanical adjusting means for selectively positioning any one of said light filters in the light path of said lens means, and
mechanical adjusting means for moving said selectively positioned light filter to any of a plurality of positions in a plane at least substantially coincident with the focal plane of said lens means whereby the area of relatively high light transmission characteristic may be aligned with the prime portion of said image of said scene.

References Cited

UNITED STATES PATENTS

| | | | |
|---|---|---|---|
| 3,001,460 | 9/1961 | Broschke | 356—218 X |
| 3,006,262 | 10/1961 | MacMillin | 88—1.5 X |
| 3,029,689 | 4/1962 | Cech | 356—219 |
| 3,304,435 | 2/1967 | Norwood | 250—237 |
| 3,347,143 | 10/1967 | Jacobs. | |

RONALD L. WIBERT, Primary Examiner

W. A. SKLAR, Assistant Examiner

U.S. Cl. X.R.

95—10, 42; 250—229, 237; 356—224, 225, 226, 234